United States Patent [19]
Müller

[11] Patent Number: 6,082,817
[45] Date of Patent: Jul. 4, 2000

[54] MOTOR VEHICLE SEAT

[75] Inventor: Olaf Müller, Rüsselsheim, Germany

[73] Assignee: INOVA GmbH Technische Entwicklungen, Rüsselsheim, Germany

[21] Appl. No.: 09/031,914

[22] Filed: Feb. 27, 1998

[30] Foreign Application Priority Data

Feb. 27, 1997 [DE] Germany .................. 197 07 998

[51] Int. Cl.[7] .................................................. B60N 2/42
[52] U.S. Cl. ..................................... 297/216.12; 297/391
[58] Field of Search ........................ 297/216.13, 216.12, 297/216.1, 391, 216.14

[56] References Cited

U.S. PATENT DOCUMENTS

| | | | |
|---|---|---|---|
| 3,397,911 | 8/1968 | Brosius, Sr. ........................ | 297/216.12 |
| 3,420,572 | 1/1969 | Bisland ............................ | 297/216.13 X |
| 5,458,396 | 10/1995 | Rost ................................ | 297/216.12 |
| 5,694,320 | 12/1997 | Breed .............................. | 297/216.12 X |
| 5,823,619 | 10/1998 | Heilig et al. .................... | 297/216.13 X |
| 5,833,312 | 11/1998 | Lenz ................................ | 297/216.13 |
| 5,842,738 | 12/1998 | Knoll et al. ...................... | 297/216.12 |

*Primary Examiner*—Peter R. Brown
*Attorney, Agent, or Firm*—Evenson, McKeown, Edwards & Lenahan, P.L.L.C.

[57] ABSTRACT

A motor vehicle seat is disclosed having a backrest on which a headrest is adjustably arranged. In this case, a headrest, which can be adjusted into a protective or safety position, and an energy accumulator are provided which can be activated in the event of a crash and operates a driving device which is designed for adjusting the headrest into the protective or safety position.

5 Claims, 10 Drawing Sheets

MOTOR VEHICLE SEAT

The invention relates to a motor vehicle seat having a backrest on which a headrest is adjustably arranged.

It is an object of the invention to utilize the headrest for increased safety functions in the event of a crash.

According to the invention, this object is achieved by a headrest which can be adjusted into a protective or safety position and a preferably pyrotechnically constructed energy accumulator which can be activated in the event of a crash and operates a driving device which is designed for adjusting the headrest into the protective or safety position.

By means of the invention, as the result of the pyrotechnic energy accumulator, the headrest, which is adjustably provided in the upper part of the seat backrest, can be brought into a protective position by way of an assigned driving device.

In the normal operation, the headrests are mainly used for comfort. In the event of an accident, the headrest can also exercise a protective function when it is brought into a protective position in which it is, for example, positioned higher in contrast to the normal operating position and is optionally moved toward the front. Mainly, in event of collision accidents, this avoids that the vehicle occupant's head carries out a movement toward the rear over the upper edge of the headrest and there is a high danger of injury to the cervical vertebrae region. The displacement of the headrest toward the front and its higher positioning prevents such a movement of the head. The headrest which is moved into the protective position holds the head in its forward position and therefore prevents injuries to the cervical vertebrae area.

For this purpose, the headrest body can be supported by means of a lever suspension which, in particular, is constructed as a four-control-arm swivelling-lever suspension. The lever suspension is brought from a normal position into the desired higher protective or safety position by the assigned driving devices driven by the energy accumulator.

The pyrotechnic energy accumulator and the assigned driving devices may be housed on or in a seat bucket of the seat, the top rail of the seat or in the seat itself or directly within the headrest.

By means of the energy accumulator, particularly of a pyrotechnic energy accumulator, the headrest can be brought from its normal operating position into the protective position by means of the assigned driving device, in which protective position the above-described safety function is achieved.

Preferably, a uniform energy unit (energy accumulator which is preferably constructed as a pyrotechnic energy accumulator) is used for several driving devices assigned to various seat components. Such a central energy unit (energy accumulator) acts upon the driving devices assigned to the respective seat components so that these are brought into their corresponding safety positions in which they exercise protective functions, such as:

Stabilizing, particularly blocking of the height and/or inclination adjusting device for a seat part;

adjusting of the inclination of the seat part by lifting the forward edge of the seat part;

additional support of the seat part on the top rail;

operating a cushion support in the area of the forward half of the seat part;

tightening a safety belt; and/or supporting the backrest on a frame (substructure of the seat) of the seat part and/or of the top rail.

The driving device may contain a linear drive and/or particularly cylindrically constructed rotary parts.

The pyrotechnic energy accumulator, which is constructed, for example, in the form of a cylinder, preferably contains all driving devices in cylinder chambers as well as chambers for the pyrotechnic charges in the form of cartridges.

By means of the figures of the drawing, the invention will be explained in detail by means of embodiments.

Figure 1:
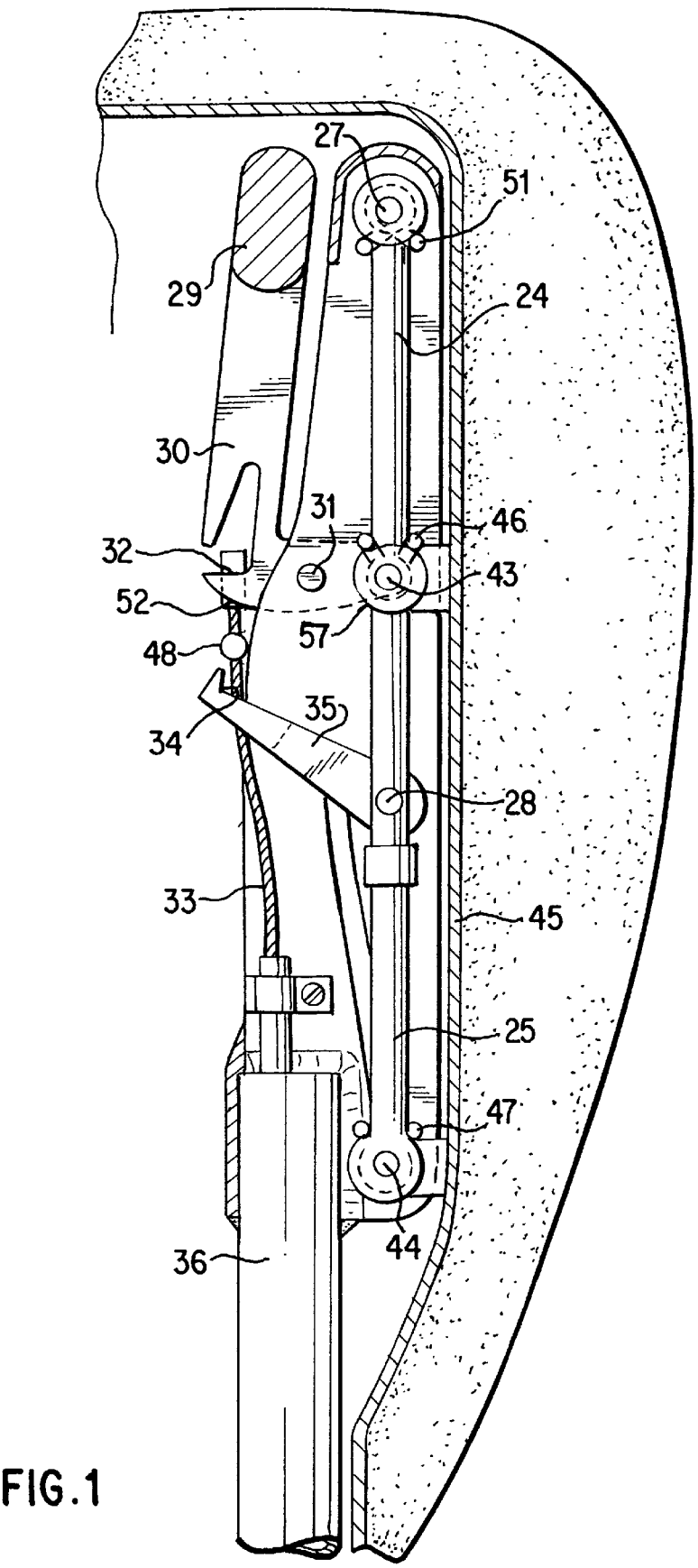
FIG. 1 is a lateral view of an embodiment of a headrest, which can be adjusted into a protective position, in a normal operating position.

In the individual representations of the drawing, identical or similar parts or parts operating in an identical or similar manner are all provided with the same reference numbers. Furthermore, in the individual illustrations, parts, assemblies and functions will also be understandable because of the selected representation, particularly by the comparison with other embodiments if they are not described separately in the following.

FIGS. 1 to 4 are schematic views of an embodiment of an adjustable headrest. This adjustable headrest may be brought from a normal operating position (comfort position) into a protective position in which, originating from the respective operating position (comfort position), it is brought into a higher situated and forward inclined position. In this manner, it is prevented that, in the event of an accident, the head is moved upward and is moved rearward over the upper edge of the headrest. This prevents mainly serious injuries to the cervical vertebrae region.

In the illustrated embodiment, a headrest body 45 is linked to a suspension which is formed by four swivelling levers (two on each headrest side). The figures show one side of the suspension. Two swivelling levers 24 and 25 are provided on each side. In swivelling axes 27 and 28, the swivelling levers 24 and 25 are linked to the frame 26 in an articulated manner. The frame 26, which is particularly constructed as a sheet metal frame, is fixedly connected with rod-shaped anchoring supports 36. The anchoring supports are anchored on the backrest of the vehicle seat which is not shown in detail. The anchoring supports 36 can optionally be guided in the backrest so that they can be telescoped or adjusted in their height.

Figure 2:
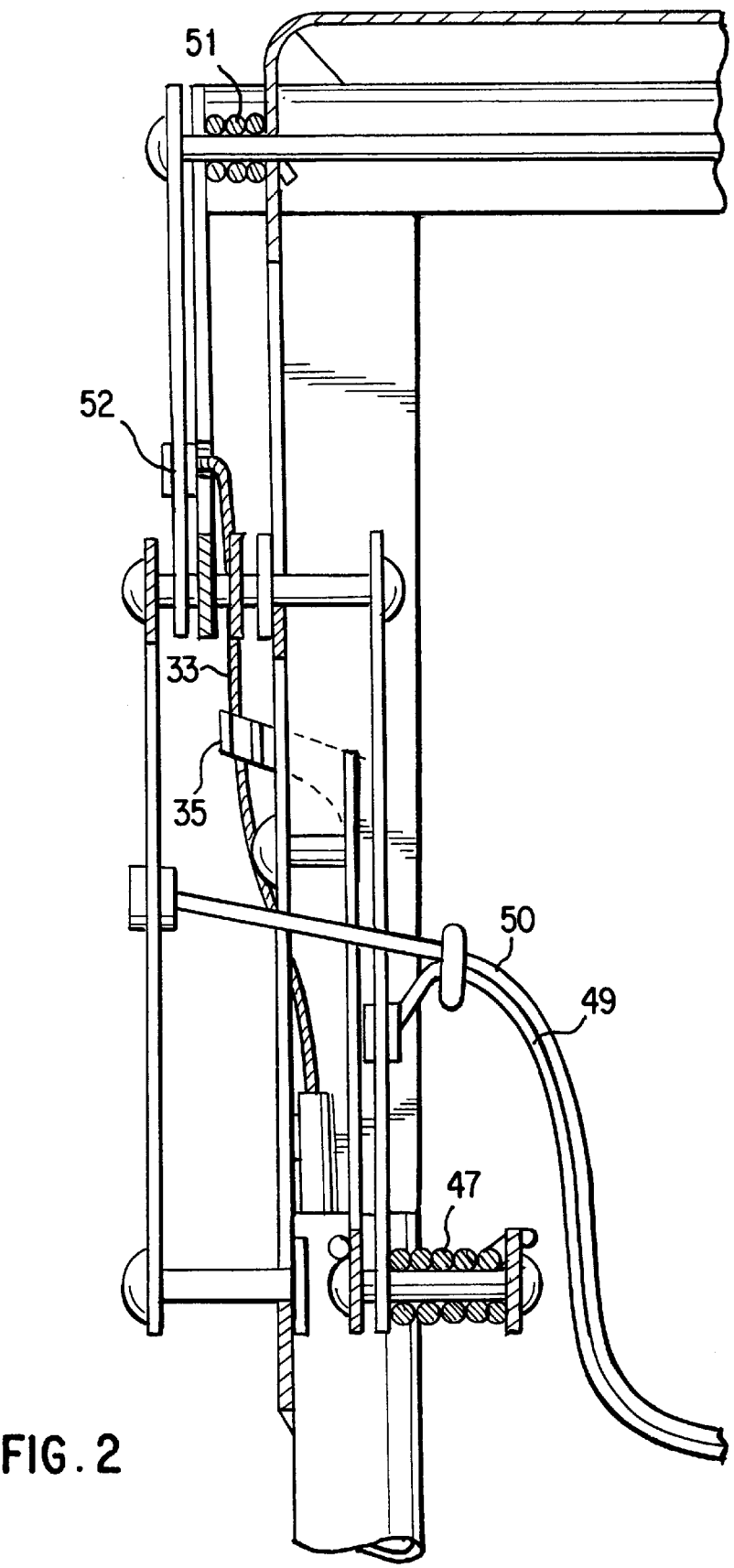
FIG. 2 is a view from the rear in FIG. 1 of the headrest illustrated in the operating position in FIG. 1.

On the other ends of the swivelling levers 24, 25, the headrest body 45 is supported in linking points 43 and 44 on the swivelling levers 24 and 25. Springs 46 and 47 are provided at linking points 43 and 44, respectively. FIGS. 1 and 2 illustrate the normal operating position (comfort position) of the headrest body 45. In this position, the articulated suspension, which is formed by the swivelling levers 24 and 25, is prestressed by means of a prestressing spring 51 in the direction of the protective position illustrated in FIG. 3. In the illustrated embodiment, the prestressing spring 51 is constructed as a flat spiral spring which acts at the swivelling axis 27.

In the normal operating position (comfort position) illustrated in FIGS. 1 and 2, a mass 29, which is swivellably disposed by way of a mass lever 30 in an axis 31 on the frame 26, is in its inoperative position. A locking point 32 is provided at the mass lever 30. A Bowden cable end 52 of a Bowden cable 33 engages or can engage with this locking point 32. A driving device D, particularly a pyrotechnic driving device, which is schematically shown in FIG. 1, is applied to the other end of the Bowden cable 33.

Another locking device 57 is provided on the mass lever 30 and locks the swivelling lever suspension (swivelling lever 24, 25) in the normal operating position illustrated in FIGS. 1 and 2; for example, as illustrated at the linking point 43.

Figure 3:
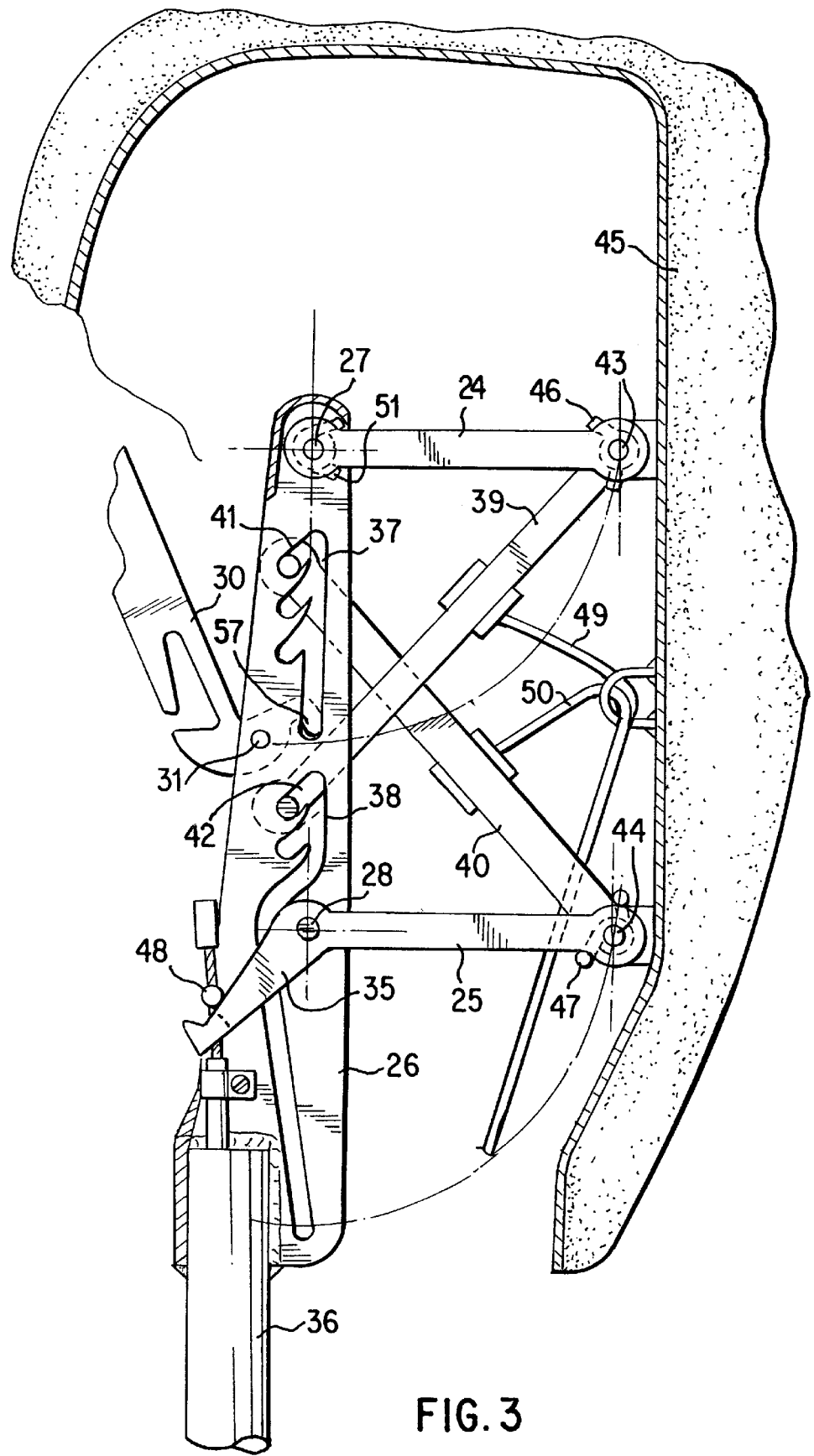
FIG. 3 is a lateral view of the headrest illustrated in FIGS. 1 and 2 after a crash.
Figure 4:
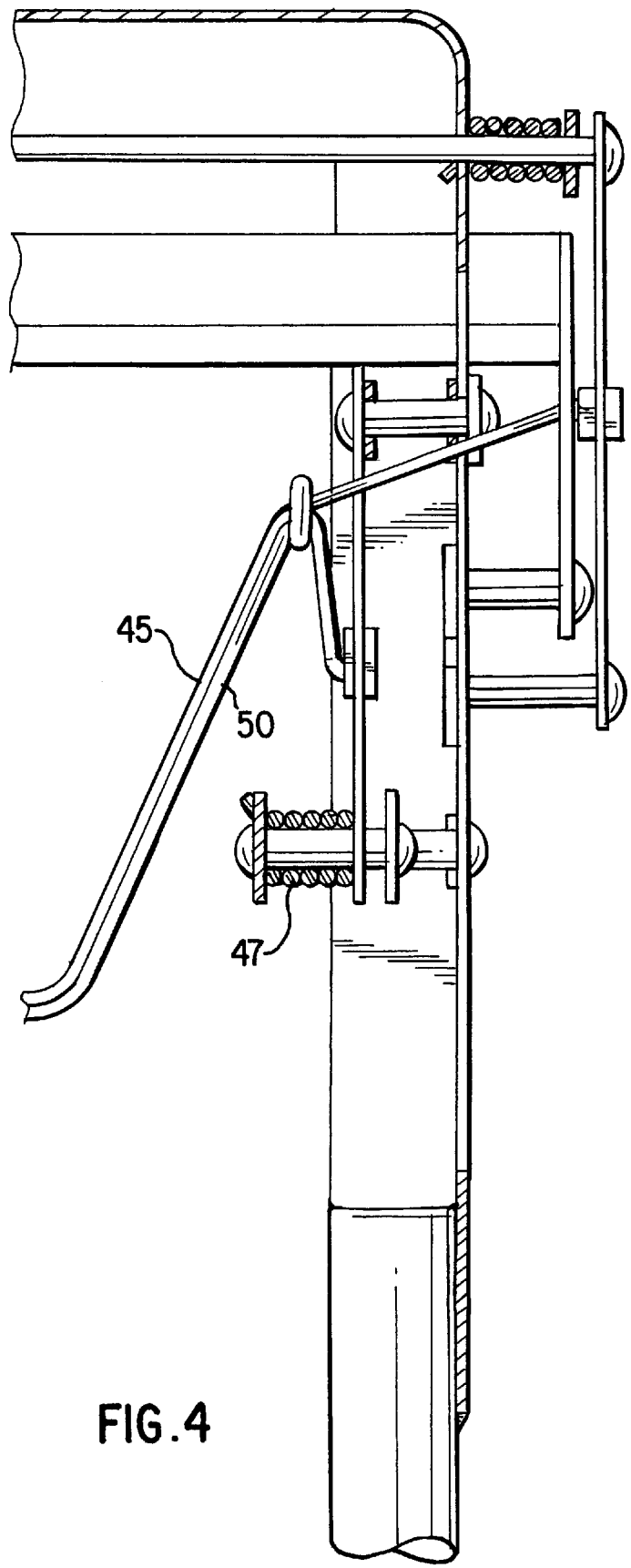
FIG. 4 is a view from the rear in FIG. 3 of the position of the headrest illustrated in FIG. 3.

For securing the protective position illustrated in FIGS. 3 and 4, in which the swivelling levers 24 and 25 take up their moved-out position, supporting levers 39 and 40 are provided which are linked to the headrest body 45. In the case of the illustrated embodiment, the linking points of the supporting levers 39 and 40 are the linking points 43 and 44. The supporting levers 39 and 40 are crossed and are guided with their other ends in guiding slots 37, 38. In end positions, the guiding slots have locking detents 41 and 42 into which the ends of the supporting levers 39, 40 lock in the moved-out position of the swivelling levers 24 and 25 illustrated in FIGS. 3 and 4. In this manner, a secure and stable support of the headrest body 45 is ensured in its protective position or safety position (FIGS. 3 and 4) on the frame 26 and on the backrest of the motor vehicle seat.

In order to return the headrest body 45 into its original position after an accident or after a faulty triggering, pull-back cables 49 and 50 are applied to the supporting lever 39 and 40. By a pull on these cables, the supporting levers 39, 40 are released from the locking detents 41, 42 so that the headrest body 45 can be returned against the force of the prestressing spring 51 into the normal position (FIGS. 1 and 2). The headrest body 45 can be brought from the normal operating position into the moved-out protective position by two different energy accumulators which are triggered by different sensors. One energy accumulator is formed by the prestressing spring, and the other energy accumulator is formed by the pyrotechnic drive which is connected with the Bowden cable.

In the event of a rear collision which may, under certain circumstances, be below the threshold of an optionally electrically triggered crash signal, the mass 29 in FIG. 1 is swivelled clockwise about the axis 31 so that the locking device 57 is released from the swivelling lever suspension, that is, from the engaging point in the area of the linking point 43 of the swivelling lever 24. The released position is illustrated in FIGS. 3 and 4. Because of the above-mentioned effect of the prestressing spring 51, the headrest body 45 is then brought into the protective position illustrated in FIGS. 3 and 4.

When, in the event of a crash, in particular, an electric crash signal is caused by the sensor device, a driving arrangement or driving device (not shown) is activated. In the process, a pull is exercised on the Bowden cable 33 by the assigned driving device which causes the mass lever 30 to swivel counterclockwise about the axis 31 so that the locking device 57 is released from the swivelling lever suspension. The Bowden cable 33 has a driving element 48 which is applied to a lever arm 35 at an application point 34. The lever arm 35 (extension arm) is rigidly connected with the lower swivelling lever 25 so that the swivelling levers 24 and 25 of the headrest suspension are brought into the position (protective position) illustrated in FIGS. 3 and 4.

If the lower swivelling lever 25 has a shorter construction than the upper swivelling lever 24, in the safety or protective position (FIGS. 3 and 4) an oblique position of the headrest body 45 is achieved such that the upper edge of the head contact surface is sloped forward with respect to the lower edge. This results in an obliquely forward sloped head contact surface in the heightened position (safety position).

Figure 5:
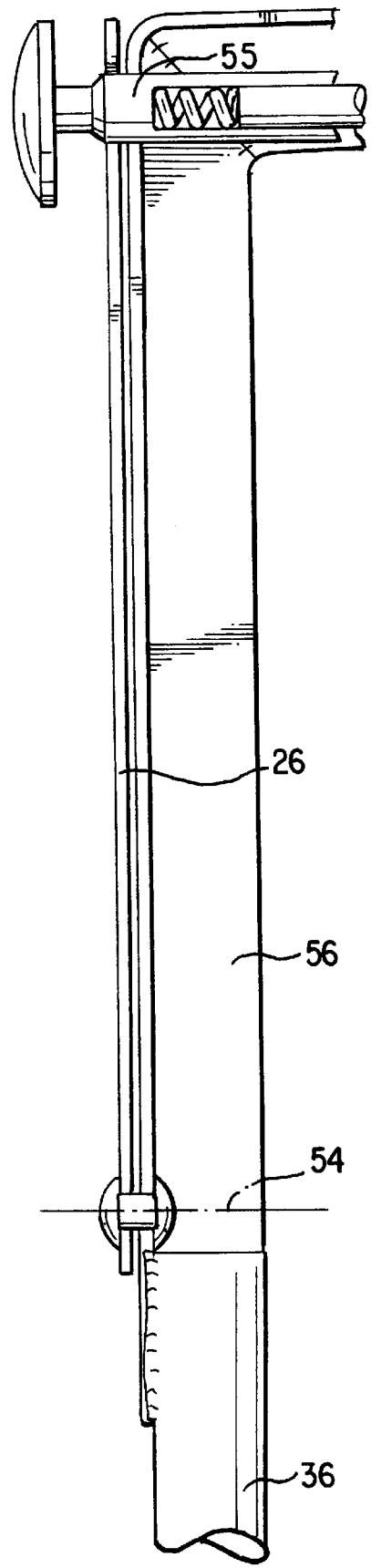
FIG. 5 is a lateral view of another embodiment of a headrest.
Figure 6:
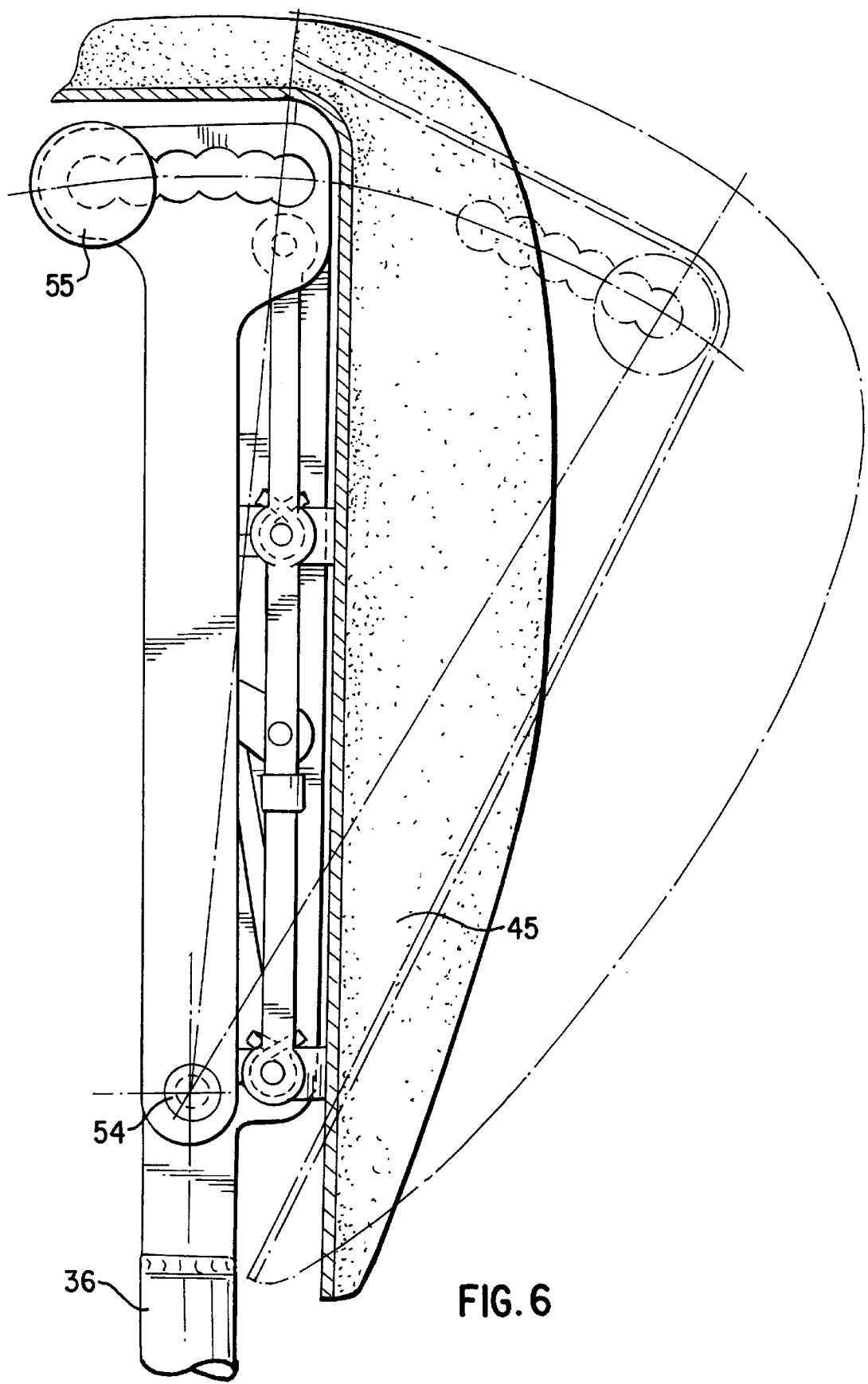
FIG. 6 is a view from the rear in FIG. 5 of the headrest of FIG. 5.

FIGS. 5 and 6 show another embodiment in which the headrest body 45, in its normal operating position (comfort position), can be adjusted into various inclined comfort positions. For this purpose, the headrest body 45, together with the linked suspension, can be swivelled about a swivelling axis 54 which is stationarily provided at the anchoring supports 36. The different inclined comfort positions of the headrest body 45 can be fixed in a stable manner by a detent device 55 on the anchoring frame 56 fixedly connected with the anchoring supports 36.

Figure 7:
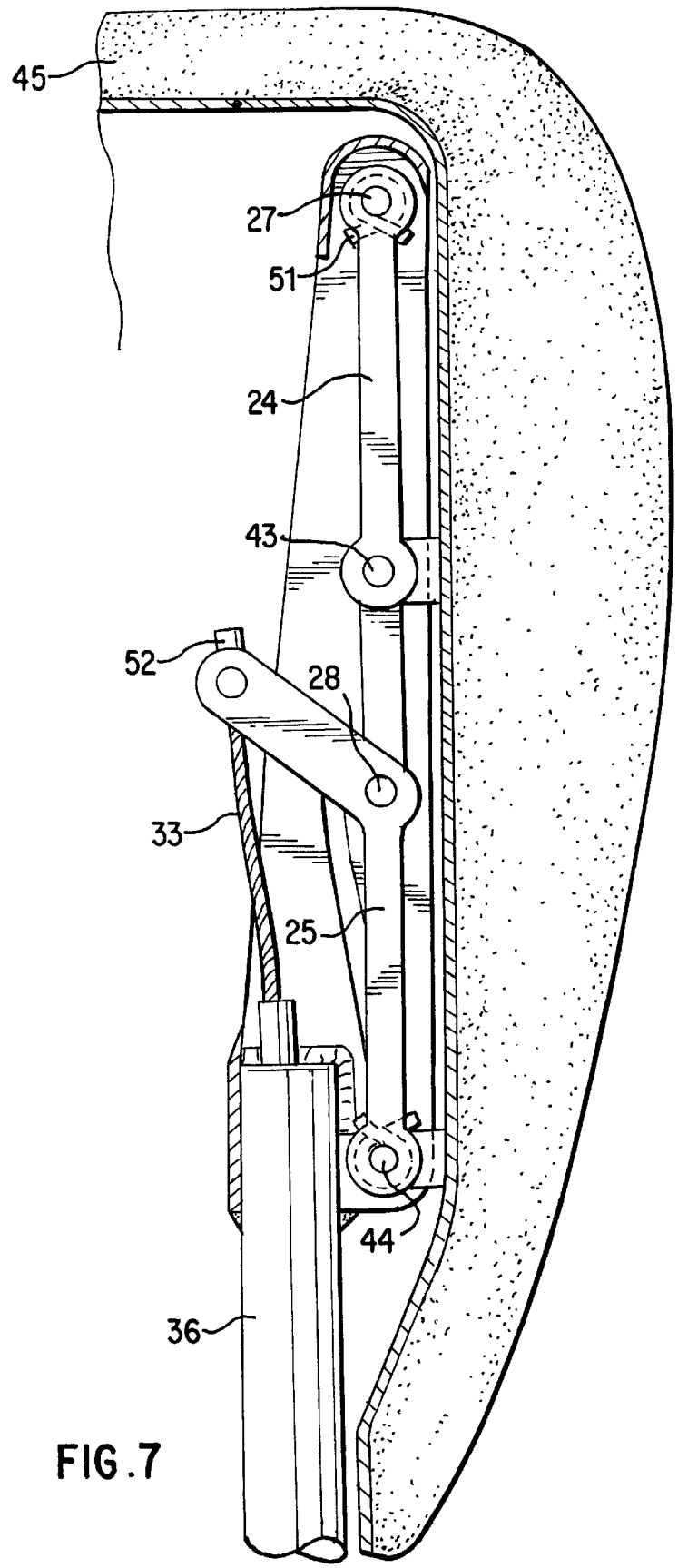
FIG. 7 is a view of another embodiment of a headrest in an untriggered condition.
Figure 8:
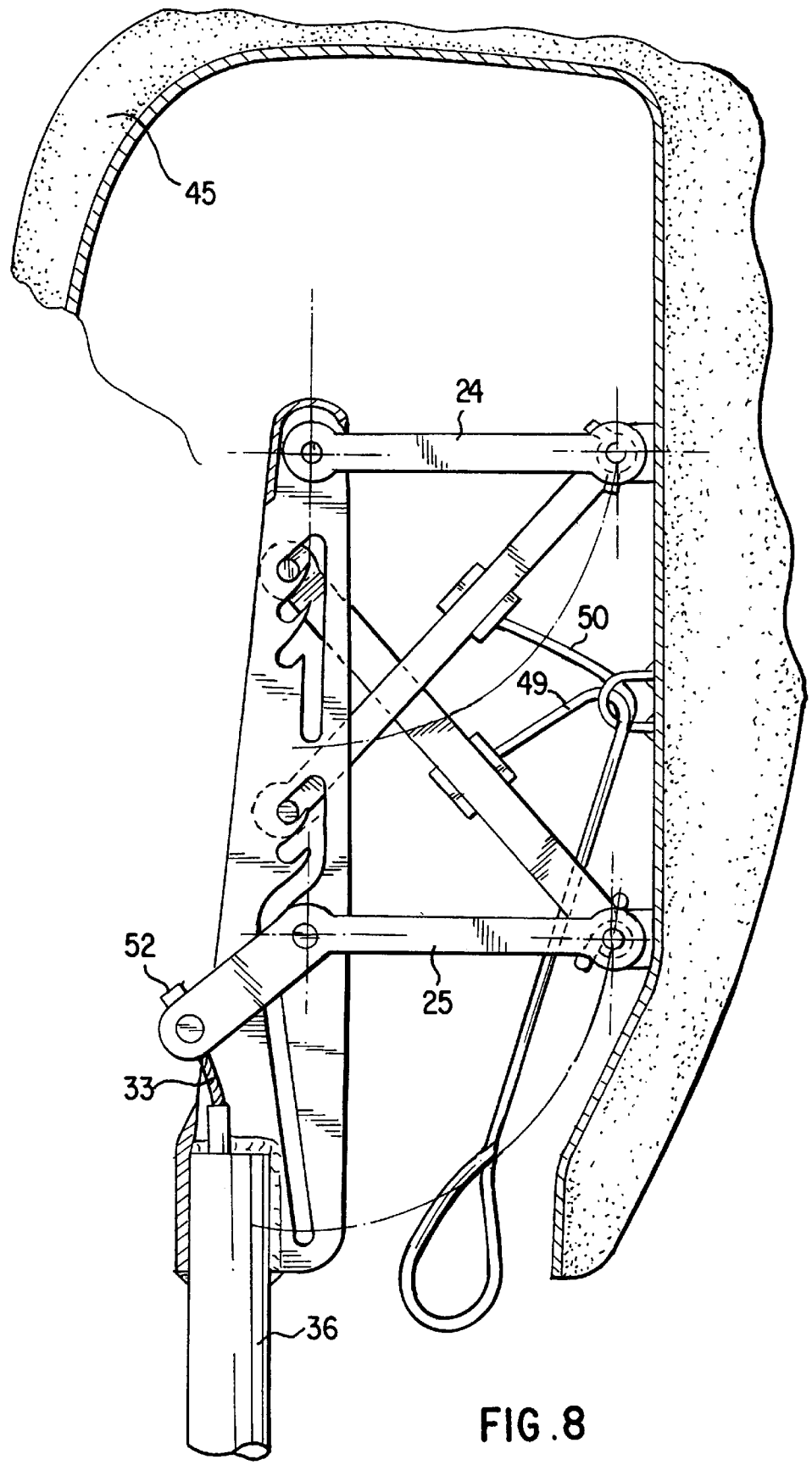
FIG. 8 is view of the headrest of FIG. 7 in the triggered condition.

FIGS. 7 and 8 show another embodiment of a headrest in an untriggered condition and in a triggered condition. The components, assemblies and their functions are easily understandable to a person skilled in the art from the illustration so that a detailed description is not required. The headrest adjustment becomes clear particularly by a comparison of the two illustrations and the comparison of the variant of the headrest with the other headrest versions discussed up to now.

Figure 9:
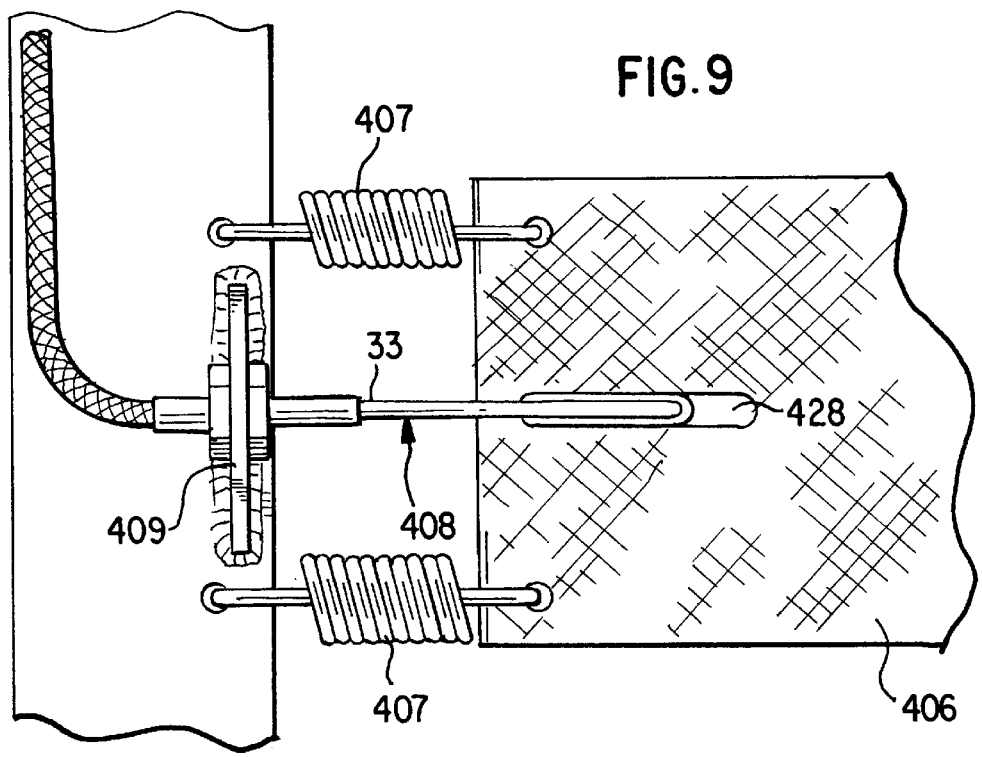
FIG. 9 is a view of a triggering device for the headrest.
Figure 10:
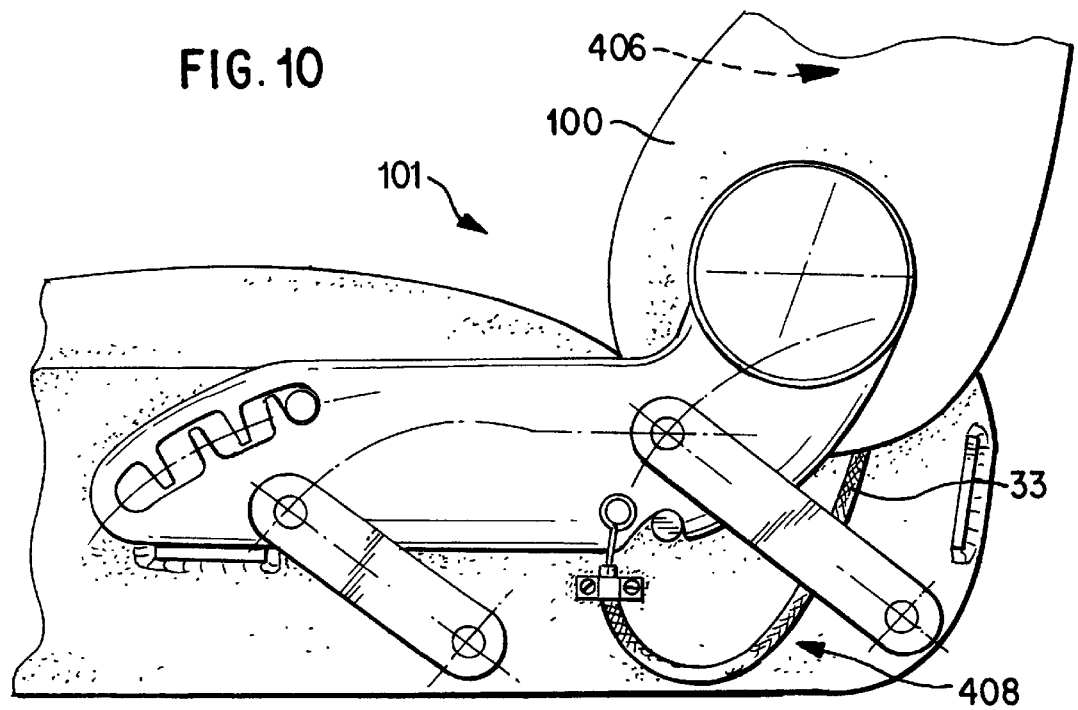
FIG. 10 is a view of a motor vehicle seat with a triggering device for the headrest according to FIG. 9 integrated in the backrest.

FIGS. 9 and 10 illustrate a triggering device for the headrest and a motor vehicle seat with a triggering device integrated in the backrest.

The operation of an embodiment of the headrest will now be explained by means of the sectional views and views of details of FIGS. 9 and 10. Within the backrest portion 100 of a vehicle seat 101, at least one pressure absorption arrangement 406 is disposed which contains, for example, a band 400, preferably two bands. The pressure absorption arrangement 406 is elastically mounted by way of springs 407 within the backrest portion 100 of the vehicle seat 101 so that, provided the seat 101 is installed in the driving direction in a vehicle, in the event of a rear collision, by means of the mass of an occupant sitting in the seat, an accelerating force is exercised on the pressure absorption arrangement 406. As a result, the pressure absorption arrangement 406 is acted upon and deflected against the force of the springs 407. This deflection, in turn, is transmitted by means of a Bowden cable 408, which is connected with the pressure absorption arrangement 406 and has adjusting devices 409, to operating devices, for example, a gas generator acting as an energy accumulator. The movement transmitted by the Bowden cable 408 can, for example, ignite an ignition cartridge (not shown) of a gas generator (not shown) and trigger the latter so that it acts upon driving devices which cause the adjusting of the headrest into the desired safety position.

In addition to being adjustable into the desired safety position, the headrest may also be otherwise adjustable or not adjustable and may be mounted externally on the seat or integrated in the seat.

In the case of the band of the pressure absorption arrangement 406, FIG. 9 also shows that the coupling of the wire of the Bowden cable 408 with the band takes place by way of a displacement slot 428 so that effects on the band, to a certain extent, remain without consequences with respect to triggering the headrest adjustment. Only when the pressure absorption arrangement 406 is acted upon beyond the extent which is permitted by the displacement slot 428 and is therefore adjusted, will there be a transmission of this movement to the wire of the Bowden cable 408 and therefore a triggering of the energy accumulator which, for example, may also be implemented by one or several prestressed spring(s). As the triggering amount, the acceleration acting upon the pressure absorption arrangement 406 and/or the deflection of the latter can be used, permissible limits values being used as the basis in each case. In order to permit certain tolerances during the adjustment of the headrest, and possibly also cause a positioning of a body or body member, damping and/or spring members (not shown) may be integrated in the tension elements. Without limitations, the triggering of the safety adjustment of the headrest may also take place in a different manner, as, for example, by a sensor-controlled electric triggering. However, the triggering of the adjustment of the headrest may also be coupled to an accident-caused adjustment or an adjustment triggered by an accident so that the energy of the impact or of the energy accumulators is also utilized as the energy accumulator for adjusting the seat.

Figure 11:
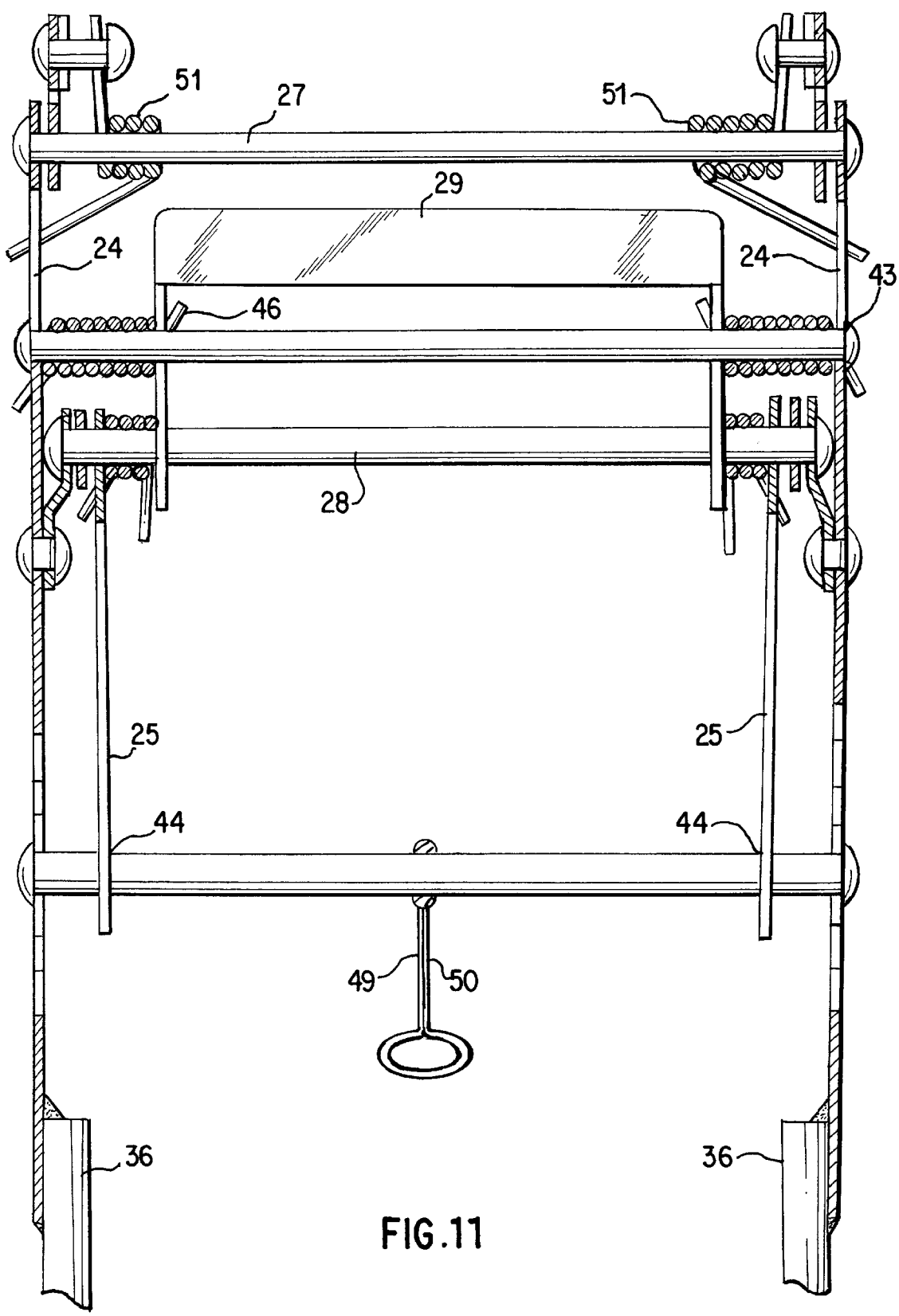
FIG. 11 is a view of an embodiment of the mechanism for adjusting the headrest.

FIG. 11 illustrates an embodiment of the mechanism for adjusting the headrest. The components, assemblies and their functions are easily understandable to a person skilled in the art from the illustration so that a detailed description is not required. The headrest adjustment becomes clear particularly by a comparison of the two illustrations and the comparison of the variant of the headrest with the other headrest versions discussed up to now.

The representations in the individual figures of the drawing are such that a person skilled in the art can recognize arts, characteristics and functions from them without any additional explanations. Embodiments of the invention, which are indicated in the complete documents and possibly also only in the drawing, contribute additional characteristics to the further development of the invention and are to be considered as examples of their respective methods of operation.

The invention is not limited by the above-described embodiments illustrated in the drawing which are used only for illustrating the possibilities. Without limitations, the invention comprises all variations, substitutions and modifications which are covered particularly by the claims which indicate the scope of the invention. Furthermore, the invention is not limited to a motor vehicle seat but can advantageously also be used in the case of any seat with a headrest, in the case of which an adjustment of the headrest according to the invention can contribute to the safety of a person sitting in the seat, for example, in merry-go-rounds, boats, airplanes, etc.

I claim:

1. Motor vehicle seat comprising:

a backrest;

a headrest including a headrest body and anchoring supports arranged on said backrest;

a frame connected to said anchoring supports;

an articulated suspension connecting said headrest body to said frame;

supporting levers linked at first ends to the headrest body and having second ends received in guiding slots defined in said frame, the guiding slots including detents into which ends of the supporting levers lock as said headrest body moves into a protective or safety position; and a driving device interconnected with said articulated suspension by which the headrest body is moved into the protective or safety position.

2. Motor vehicle seat according to claim 1, wherein the driving device is constructed as a pyrotechnic driving device.

3. Motor vehicle seat according to claim 1, and further comprising prestressed spring devices by which the articulated suspension is prestressed to move the headrest body into the protective or safety position.

4. Motor vehicle seat according to claim 1, and further comprising a Bowden cable which interconnects the driving device with the articulated suspension for adjusting the headrest into the protective or safety position.

5. Motor vehicle seat according to claim 1, wherein the articulated suspension moves said headrest body from a normal operating comfort position into a higher and obliquely forward inclined position which defines the protective or safety position.

* * * * *